Figure 1:
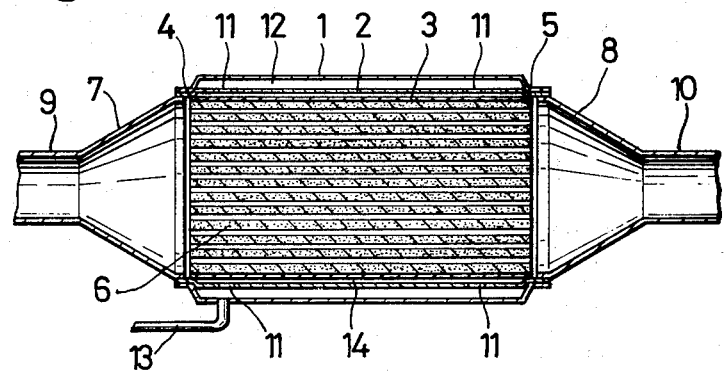

United States Patent [19]

Frietzsche

[11] 3,972,687

[45] Aug. 3, 1976

[54] CATALYTIC CONVERTER HAVING PRESSURIZED-GAS SUPPORT MEANS

[75] Inventor: Günther B. Frietzsche, Edenkoben, Palatinate, Germany

[73] Assignee: Paul Gillet GmbH, Edenkoben, Palatinate, Germany

[22] Filed: Mar. 21, 1974

[21] Appl. No.: 453,343

[52] U.S. Cl. .......................... 23/288 FC; 23/288 F; 60/299
[51] Int. Cl.[2] ..................... F01N 3/15; F01N 7/00
[58] Field of Search ...... 23/288 FC, 288 FB, 288 F; 60/299

[56] References Cited
UNITED STATES PATENTS

| | | | |
|---|---|---|---|
| 3,189,418 | 6/1965 | Gary | 23/288 FC |
| 3,211,534 | 10/1965 | Ridgway | 23/288 FC |
| 3,441,381 | 4/1969 | Keith et al. | 23/288 FC |
| 3,473,323 | 10/1969 | Briggs et al. | 23/288 FC |
| 3,581,490 | 6/1971 | Morris | 23/288 F |
| 3,687,224 | 8/1972 | Lundin | 181/72 X |
| 3,801,289 | 4/1974 | Wiley | 23/288 FC |
| 3,817,714 | 6/1974 | Wiley | 23/288 FC |

*Primary Examiner*—Morris O. Wolk
*Assistant Examiner*—Bradley R. Garris
*Attorney, Agent, or Firm*—Robert H. Jacob

[57] ABSTRACT

Exhaust system especially for motor vehicles of the type having a monolith of ceramic material serving as a catalyst support disposed in a metallic housing, said monolith being supported only radially in a double walled mantle having an inner wall of thin foil-like material closely encompassing the monolith and an outer wall defining the sole support connected at the ends in seal-like fashion and the inner space of which is filled with gas under pressure.

9 Claims, 10 Drawing Figures

CATALYTIC CONVERTER HAVING PRESSURIZED-GAS SUPPORT MEANS

The invention concerns a muffler or exhaust device particularly for motor vehicles with a ceramic monolith that serves as a catalyst support. The catalyst is intended to serve for the subsequent combustion of combustible components that are carried along by the exhaust gases. So-called monoliths made of ceramic material have proven to be very useful catalyst supports which are provided with a plurality of channels extending parallel to one another and which are merely separated from one another by thin intermediate walls along the direction of gas flow.

These ceramic monoliths have to be supported somewhere and somehow in the exhaust gas pipe of the muffler system in a metallic housing that surrounds them in gas-tight fashion. This mounting involves problems that are not insignificant, because the ceramic monolith has a coefficient of temperature expansion that is about 10 times smaller than that of steel. In addition the temperature differences between the environment and the exhaust system when not in operation and of the exhaust system in operation are very great. Furthermore oscillation loads are also possible, which have to be eliminated, and particularly there must not be any resonances between the ceramic monolith and the housing that surrounds it and in which it is mounted.

Known embodiments provide mounting means for the monolith in radial direction by supporting elements installed between the monolith surface and the inner surface of the housing that are supposed to have an undulated shape, and they may also consist of a woven wire knit. The mounting in axial direction takes place simply without taking into consideration expansion differences in that direction and without interfitting elastic mounting elements by means of flanges extending inwardly from the housing and fixing the monolith in position.

This known manner of mounting to be sure may at least partly overcome the problems that exist, but it later fails under heavy oscillation loads and high temperature differences, which may be the case especially when the installation of the ceramic monoliths is located in the proximity of the engine close to the manifold. The supporting means then lose their resilience very rapidly and are finally destroyed, which is due to burning out and changes of the materials caused by the warm-cold effect.

Accordingly, it is an object of the invention to provide in the exhaust system a mounting means for the ceramic monolith in the metallic housing which surrounds it which insures unobjectionable mounting of the monolith, while also taking into consideration the great temperature differences, as well as avoiding transmission of oscillations to the monolith, particularly at the high operating temperatures that are to be expected.

The invention solves the problem by means of a muffler system having a ceramic monolith that serves as a catalyst support which is surrounded by a metallic housing preferably of steel, in such a manner that the mounting for the monolith is in a double-walled body whose inner wall that surrounds the radial surface of the monolith consists of a thin, highly heat resistant metal sheet that is connected in a gas-tight or air-tight manner with the outer wall and where the space formed by the two walls is filled with gas or air under pressure.

By this manner of mounting the inner thin foil-like wall firmly envelopes the installed monolith in the area of its entire radial surface. Thus, the monolith is mounted in an unobjectionable manner to meet the problems indicated and to overcome the same, while support in axial direction is not necessary. The even pressure that acts circumferentially on the radial surface of the monolith can never be obtained by means of the known resilient elements that have been used heretofore for this purpose. By heating of the monolith and of its housing, the gas in the pressure container surrounding the monolith expands. The forces pressing against the monolith are thus increased, so that the dimensional differences between monolith and housing that result from the different heat expansion coefficients are balanced out. The support of the monolith thus has a progressive pressure increase that follows parallel to the temperature increase, and thus it acts exactly in the opposite manner from all other mechanical mounting means used heretofore.

Further features of the invention and of the advantages obtained thereby will become apparent from the following description of a series of embodiments of the invention illustrated purely schematically and by way of example in the accompanying drawings, in which FIGS. 1 to 4 show different embodiments in longitudinal section, FIGS. 5 to 10 illustrate different possibilities of realizing the gas supply systems.

In the embodiment in accordance with FIG. 1, a housing mantle 1 is connected with a supporting mantle 2 and with a mantle made of thin foil-like sheet metal in a gas-tight manner at 4 and 5, for example by welding. The ceramic monolith 6 is supported solely by the foil mantle 3. The housing mantle 1 merges in a known manner with two frusto conically shaped areas 7 and 8 which constitute the transit to the pipes 9 and 10 of the muffler system.

The mantle 2 is provided with perforations 11 by way of which it is connected with the chamber 12 formed by the outer mantle 1. The chamber 12 has a connecting stub 13 for introducing a pressure gas which in the practice is preferably air under pressure.

If the chamber 12 and therefore also the inner chamber 14 are under pressure, the inner mantle 3 transmits these pressure forces onto the mantle surface of the monolith 6, which provides for effective support for the monolith under all imaginable operating conditions, also in simulated testing setups. With the embodiment shown here the outer housing mantle 1 takes care of two functions. For one thing it serves as a reserve container for the air under pressure, and on the other hand, it simultaneously constitutes a cooling mantle. With this special form of construction it has been found that when the temperature in the monolith was 1000°C, the surface temperature of the air mantle constituted by the chamber 12 was only 280°C, i.e., a considerable amount less than with the conventional mountings (about 180°C less), or also with the basic mounting proposed in accordance with the invention which has only two mantles and accordingly one air chamber.

The mounting of the monolith by means of the inner mantle 3 is so perfect that axial support is no longer necessary. This affords possibilities of introducing the monolith in the housing in a manner that it is exchangeable, which will be discussed later on more in detail.

Figure 2:
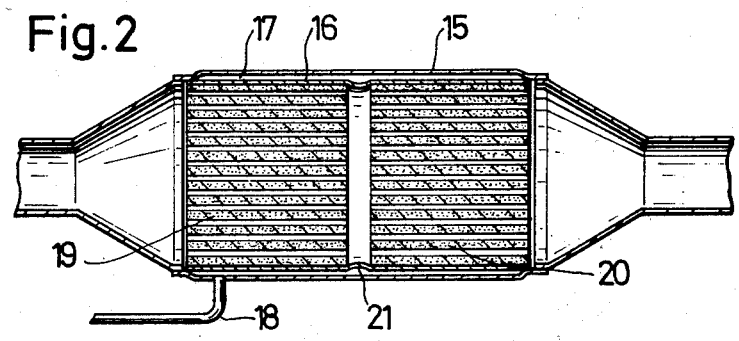

FIG. 2 shows a simple embodiment. Here only an outer housing mantle 15 is provided and a sheet metal foil mantle 16 that is welded thereto at the ends in a gas-tight manner. The supply into the chamber 17 thus formed is by way of a connection 18. In the illustrated embodiment the housing 15 is equipped with two monoliths 19 and 20. In order to make possible simple installation of these monoliths without any special adjusting measures, the inner mantle 16 may be provided with a bead 21. Moreover, it has also been found that even without such a bead the monoliths did not change their position during more than several hundred hours on the test stand. This bead thus serves exclusively for facilitating the assembly.

Figure 3:
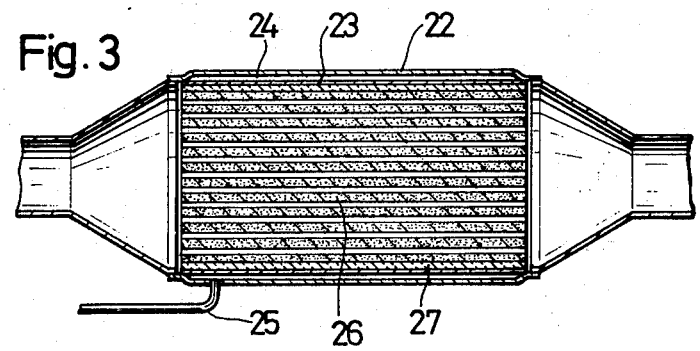

As shown in FIG. 3, the monolith may be surrounded by a mantle layer which on the one hand improves the heat insulation of the device, and on the other hand, the adaptation between the tin foil mantle and the mantle surface of the monolith. Accordingly, also here a pressure chamber 24 with a connecting stub 25 is formed by an outer housing mantle 22 and a sheet foil mantle 23. Between the sheet foil mantle 23 and a mounted monolith 26 there is a layer 27, for example, of suitable glass fiber web, or also a mixture of a suitable highly heat resistant cement with a mineral fiber fleece.

Figure 4:
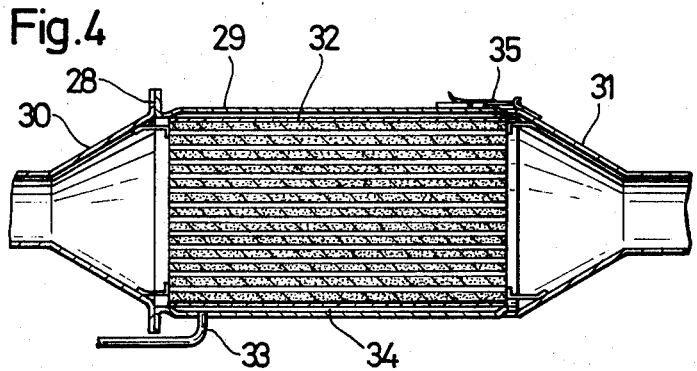

As already mentioned, the elimination of a support for the monolith in axial direction makes possible a simple manner of exchange or replacement, because it is no longer necessary to provide supporting or bearing means of any kind in the axial direction. It is sufficient for exchangeability as shown at the left of FIG. 4 to provide a flange connection 28 between the outer mantle 29 and the adjacent conical transition area 30. A different possibility is shown on the right side of FIG. 4. Here the connection between the housing mantle 29 and the conical connecting member 31 is made by means of snap fasteners 35 which, of course, makes it necessary to provide a suitable seal. Together with an inner tin foil mantle 32 the housing mantle 29 again forms a pressure chamber 34 that may be supplied by way of connection 33.

With this embodiment, it is possible to exchange the monoliths after a certain time of use in simplest fashion. Inasmuch as it must be expected that the monoliths have to be exchanged much sooner than the housing which is included in the system of the exhaust installation, the possibility of exchanging the monoliths can be of considerable importance. It is simply sufficient here to release the pressure from chamber 34, open the housing at the flange or the snap fastener connection, remove the monolith from the housing and slide in a new monolith. The exchange of the monolith in such simple fashion will in any event be essentially cheaper than the replacement of the entire part of the installation including the housing.

The space serving as pressure chamber, which is defined by an outer supporting mantle that may at the same time be the housing mantle, and the inner mantle of highly heat resistant foil-like sheet metal, has to be filled in some way with a gas under pressure, preferably compressed air, while it is decisive for the source of compressed air to be chosen that a certain pressure must be built up, but that then no air is constantly used up by even the smallest leakage losses in the supply of air under pressure or in the production device proper.

Figure 5:
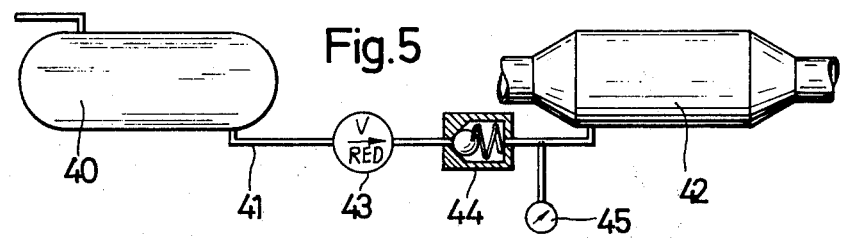

In the simplest case a reserve pressure container 40 is provided as shown in FIG. 5, which can be pumped up like a tire at any gas station. In the connection pipe 41 from this reserve pressure container to the housing 42 of the monolith and the pressure chamber provided therein, a pressure reducing valve 43 and a non-return or check valve 44 are arranged. By means of these valves care is taken that the compressed air supply is always closed and the monolith is firmly supported by the air pressure that is built up in the pressure chamber. A manometer 45 provided in the compressed air supply indicates the existing final pressure. As during operation the monolith is heated and thereby the housing, the air in the pressure chamber around the monolith will expand so that thereby the pressure is still increased which is quite in accordance with the manner of operation desired and obtained in accordance with the invention.

Figure 6:
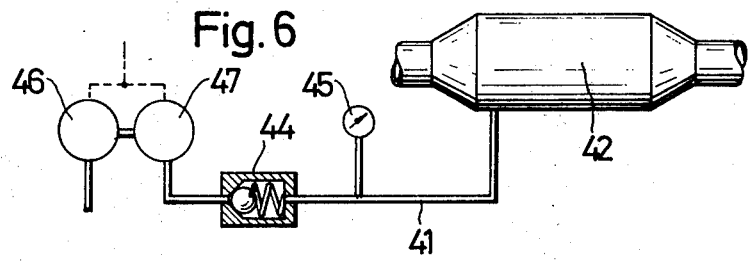

An especially economical solution for the compressed air supply is illustrated in FIG. 6. Here an air pump 46 that is mounted in the vehicle which is necessary for producing the air blown in for oxidation is utilized additionally for producing the pressure necessary for supporting the monolith. The conventional air pumps used must, however, be somewhat modified in order to be able to also produce the pressure necessary for supporting the monolith. This is readily made possible by a second stage 47 of the pump which merely has to serve for producing pressure, because in the system of the pressure chamber no air is used up.

Figure 7:
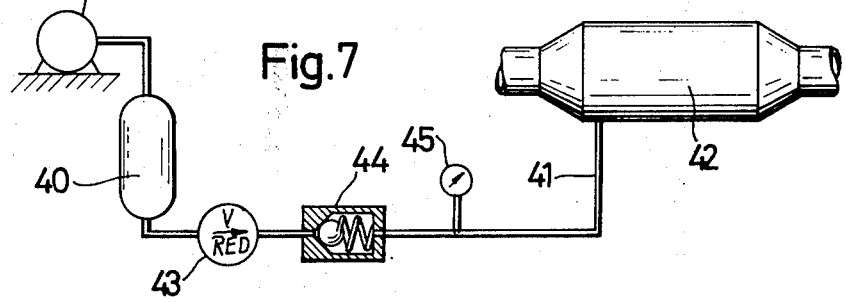

FIG. 7 shows a possibility of supplying the reserve pressure container 40 with compressed air by means of a small electrically driven compressor 48. This provides the possibility, for example, to locate the compressor 48 in the frame of the electrical system of the automobile in such a manner that it starts already in the position of the ignition key "ignition on," and thus the necessary supporting pressure in the housing 42 for support of the monolith has already been reached when the engine subsequently is turned on and starts.

Figure 8:
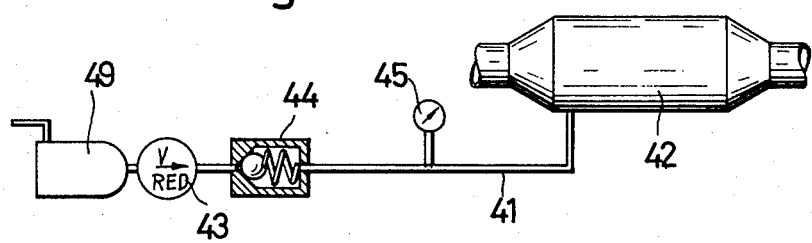

A further modification of the supply of air pressure is illustrated in FIG. 8. This can also be done by means of a compressed air bottle 49 obtainable on the market and which can be exchanged. Compressed air bottles of this type are readily available.

Figure 9:
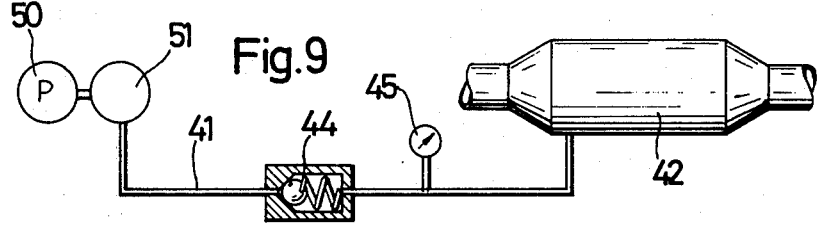

Also the hydraulic pump 50 that is provided in motor vehicles for producing a hydraulic pressure can be used in this connection as shown by FIG. 9. By way of a suitable hydraulic pneumatic device 51, the pressure in the hydraulic system takes care of producing sufficient pressure in the pneumatic system for supporting the monolith. Conventional and known structural components are here relied on which do not require any detailed description.

Figure 10:
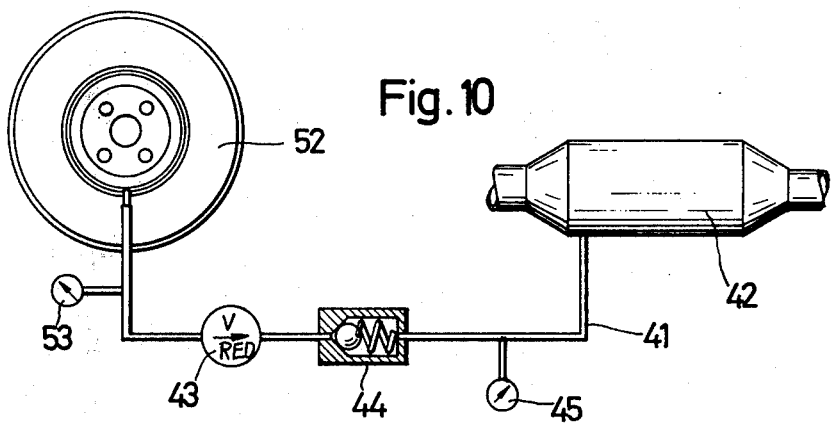

Finally, there is a possibility as shown in FIG. 10 to employ as a reserve air container the spare tire 52 that is carried by all motor vehicles. For example, it would be possible to pump up the tire to a pressure of 2.5 to 3atm., for which purpose the pressure reducing valve 43 would have to be set so that for a permissible maximum pressure of the spare tire of 1.6atm. no further air is removed from it when an indicator 53 shows that renewed pumping of the system is necessary.

Having now described my invention with reference to the embodiments illustrated in the drawings, what is claimed and desired to be protected by letters patent of the United States is set forth in the appended claims:

1. Exhaust system, especially for motor vehicles, comprising an exhaust pipe and an exhaust gas purifying device of the type having a monolith of ceramic material carrying a catalyst, the monolith being disposed in a metallic housing having an inlet and an outlet for exhaust gas being purified, said monolith being supported only radially in a double walled mantle having a thin inner sheet metal wall closely encompassing the monolith and an outer housing wall, said double walled mantle defining the sole support, said inner and outer walls being connected at their longitudinal ends exclusively by sealing one wall to the other and defining between them an annular space, which is filled with gas under pressure, and a conduit connecting said annular space to a source of gas under pressure.

2. Exhaust system in accordance with claim 1, including connection elements between the housing surrounding said monolith and the pipes of said exhaust system, said connection elements being frusto-conical and including releasable means such as flanges.

3. Exhaust system in accordance with claim 1 wherein the housing surrounding said monolith comprises the supporting mantle for said monolith and said mantle further comprises a third mantle member defining an intermediate, perforated support wall disposed between said outer housing wall and said thin inner sheet metal wall, all of said mantles being sealed together in gas-tight fashion.

4. Exhaust system in accordance with claim 3 comprising a layer of mineral fiber fleece, having a high heat resistance, disposed between said inner wall and the adjacent surface of said monolith.

5. Exhaust system in accordance with claim 1, wherein said gas source comprises a reserve pressure container and said connecting conduit includes a pressure reducing valve, a check valve and a manometer connected therewith.

6. Exhaust system in accordance with claim 5, wherein said reserve pressure container is the spare tire of the vehicle.

7. Exhaust system in accordance with claim 5, including a compressor connected to said reserve pressure container.

8. Exhaust system in accordance with claim 7, comprising a hydraulic pump connected to said pressure container.

9. Exhaust system in accordance with claim 7, including an air pump for supplying said compressor with air.

* * * * *